United States Patent
Sharma et al.

(10) Patent No.: US 12,430,209 B2
(45) Date of Patent: Sep. 30, 2025

(54) FAIL-OPEN OPERATION FOR DATA REPOSITORY INDICES

(71) Applicant: T-Mobile USA, Inc., Bellevue, WA (US)

(72) Inventors: Anuj Sharma, Broadlands, VA (US); Erik Karel Kosar, Newcastle, WA (US); Sandesh Shetty, Sammamish, WA (US); Deepesh Belwal, Ashburn, VA (US); Osama Khamis Mustafa, Maple Valley, WA (US); Sriharsha Kadalbal, Sammamish, WA (US); Vasu Krishnasami, Bellevue, WA (US); Chris Jensen, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 63 days.

(21) Appl. No.: 18/435,170

(22) Filed: Feb. 7, 2024

(65) Prior Publication Data
US 2025/0252018 A1     Aug. 7, 2025

(51) Int. Cl.
| | |
|---|---|
| G06F 11/07 | (2006.01) |
| G06F 11/14 | (2006.01) |
| G06F 11/30 | (2006.01) |
| H04W 8/20 | (2009.01) |
| H04W 12/72 | (2021.01) |

(52) U.S. Cl.
CPC ...... G06F 11/1402 (2013.01); G06F 11/3072 (2013.01); H04W 8/20 (2013.01); H04W 12/72 (2021.01)

(58) Field of Classification Search
CPC .. G06F 11/1402; G06F 11/3072; H04W 8/18; H04W 8/20; H04W 8/72
USPC .............................................. 714/15, 21, 49
See application file for complete search history.

(56) References Cited

U.S. PATENT DOCUMENTS

| | | | |
|---|---|---|---|
| 2009/0018839 A1* | 1/2009 | Cooper | G10L 13/00 704/E15.045 |
| 2019/0132630 A1* | 5/2019 | Loheide | H04N 21/23439 |
| 2021/0089508 A1* | 3/2021 | Laskawiec | G06F 16/215 |
| 2021/0211750 A1* | 7/2021 | Loheide | H04L 65/611 |
| 2022/0164366 A1* | 5/2022 | Kuppahally | G06F 16/27 |
| 2022/0414164 A1* | 12/2022 | Vilcinskas | G06F 16/9558 |

* cited by examiner

*Primary Examiner* — Chae M Ko
(74) *Attorney, Agent, or Firm* — Lee & Hayes, P.C.

(57) ABSTRACT

Described herein is a node of a telecommunications network configured to determine that a primary index for data repositories of the telecommunications network is operating in a fail-open mode and, in response, provide a request received by the node to substantially all data repositories referred to by the primary index. The node is further configured to receive a response from one of the data repositories and, based at least in part on the response, build a secondary index mapping data repositories to subscriber identifiers. When a further request is received by the node in fail-open mode, the node may refer to the secondary index first and, if the subscriber identifier from the further request is not present in the secondary index, provide the further request to substantially all data repositories referred to by the primary index.

20 Claims, 4 Drawing Sheets

FAIL-OPEN OPERATION FOR DATA REPOSITORY INDICES

BACKGROUND

Subscriber data in telecommunications networks is stored in subscriber profile databases. Examples of such databases include unified data repositories (UDRs) if Fifth Generation (5G) networks, home subscriber servers (HSSs) in Fourth Generation (4G) networks, and home location registers (HLRs) in Third Generation (3G) networks. Both for redundancy and to distribute the load, no single database stored all subscriber profiles. Profiles associated with a range of subscriber identifiers may be stored in one database, and profiles associated with a different range of subscriber identifiers may be stored in a different database. In order to route requests-either requests from, e.g., user equipment (UEs) to read subscriber data or from a provisioning system of a telecommunications network to write subscriber data—a node with an index mapping ranges of subscriber identifiers to subscriber profile databases is used by the telecommunications network.

In failure situations, the node with the index must either have a redundant, online backup node—which may have the same failure or corruption—or continue to operate. Operating during an ongoing failure is known as operating in fail-open mode.

BRIEF DESCRIPTION OF THE DRAWINGS

The detailed description is set forth with reference to the accompanying figures. In the figures, the left-most digit(s) of a reference number identifies the figure in which the reference number first appears. The same reference numbers in different figures indicate similar or identical items.

DETAILED DESCRIPTION

This disclosure is directed in part to a node of a telecommunications network configured to determine that a primary index for data repositories of the telecommunications network is operating in a fail-open mode. In response, the node provides a request received by the node to substantially all data repositories referred to by the primary index. The node is further configured to receive a response from one of the data repositories and, based at least in part on the response, build a secondary index mapping data repositories to subscriber identifiers. When a further request is received by the node in fail-open mode, the node may refer to the secondary index first and, if the subscriber identifier from the further request is not present in the secondary index, provide the further request to substantially all data repositories referred to by the primary index. While in fail-open mode, the node may perform reconciliation, updating the primary index based on the secondary index and exiting fail-open mode when every entry in the primary index has a later timestamp than its counterpart in the secondary index.

In some implementations, a data repository may be involved in migration of its data, either as a source or as a target of data migration. In such circumstances, when the source and destination data repositories respond to the request routed to all data repositories, each may provide an indication of whether it is the source repository or the target repository. The node may then receive the responses and, when deciding which response it should use to build the secondary index, the node may look to the provided indications and use the response from the source repository. The node may do this until the data migration is complete.

As used herein, the "node" may refer to one or more devices that fulfill one of two roles. The first role, that of the unified subscriber database provisioning orchestrator (UPO) involves providing requests from network operator systems, such as billing, provisioning, and customer care to data repositories. The second role, that of the network index database repository (NIDR) and the routing manager, involves providing requests from UEs, access networks, or core network nodes to the data repositories. The NIDR and routing manager can also be separate nodes working together, but for the sake of illustration, they are shown and described as a single node throughout this disclosure. The telecommunications network may also have nodes in both of these roles-a UPO node and a NIDR/routing manager node, and each may have a primary index. In such circumstances, those nodes may reconcile with one another when recovering in fail-open mode. In other examples, one of the nodes (e.g., the UPO) may simply use the primary index of the other (e.g., the NIDR/routing manager node).

Figure 1A:
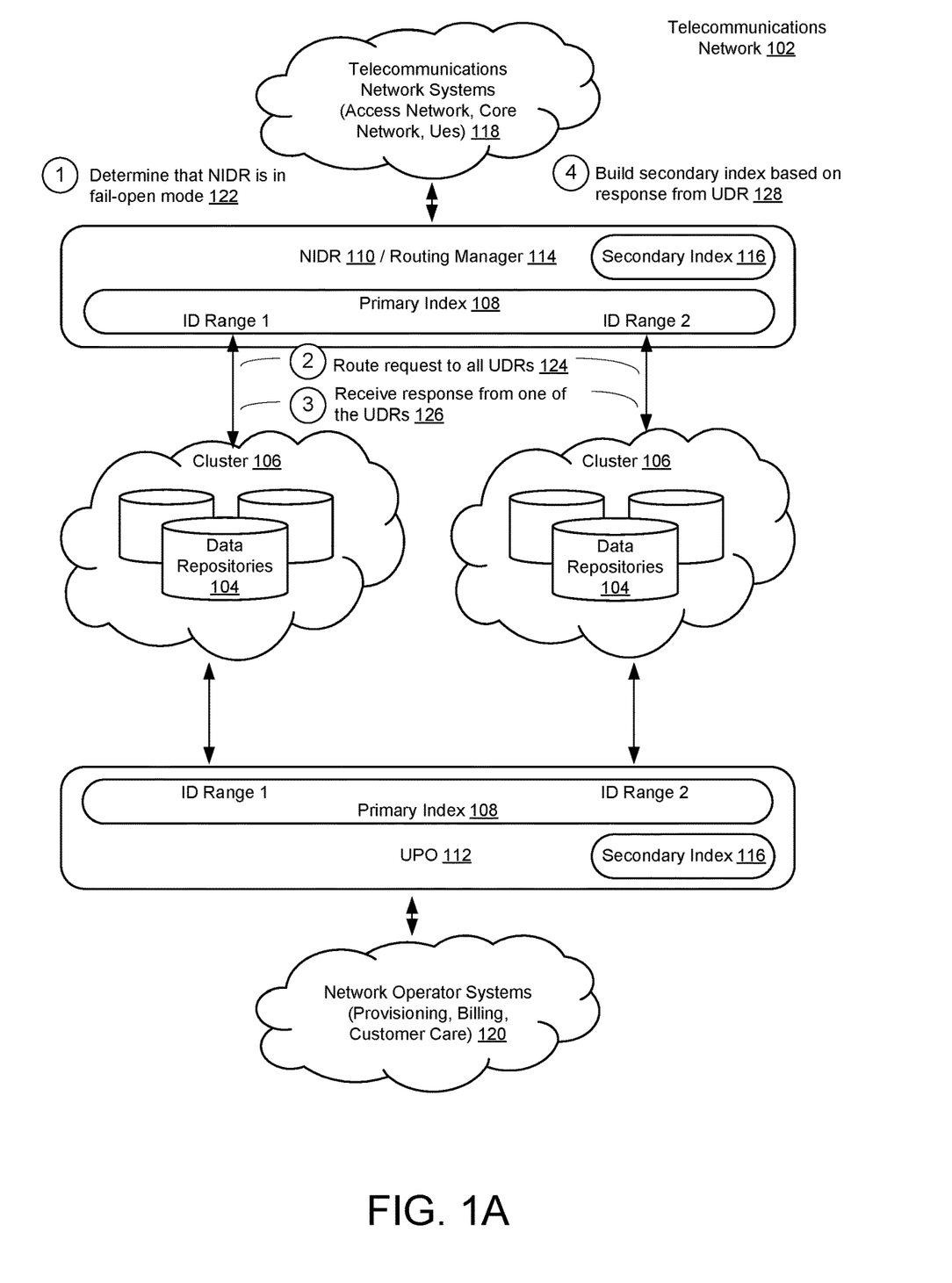
FIGS. 1A-1B are overview diagrams of a telecommunications network having multiple data repositories mapped to ranges of subscriber identifiers by a primary index, a node including the primary index, and other devices and logic, the node routing received messages to all data repositories when operating in a fail-open mode and building a secondary index from responses.
Figure 1B:
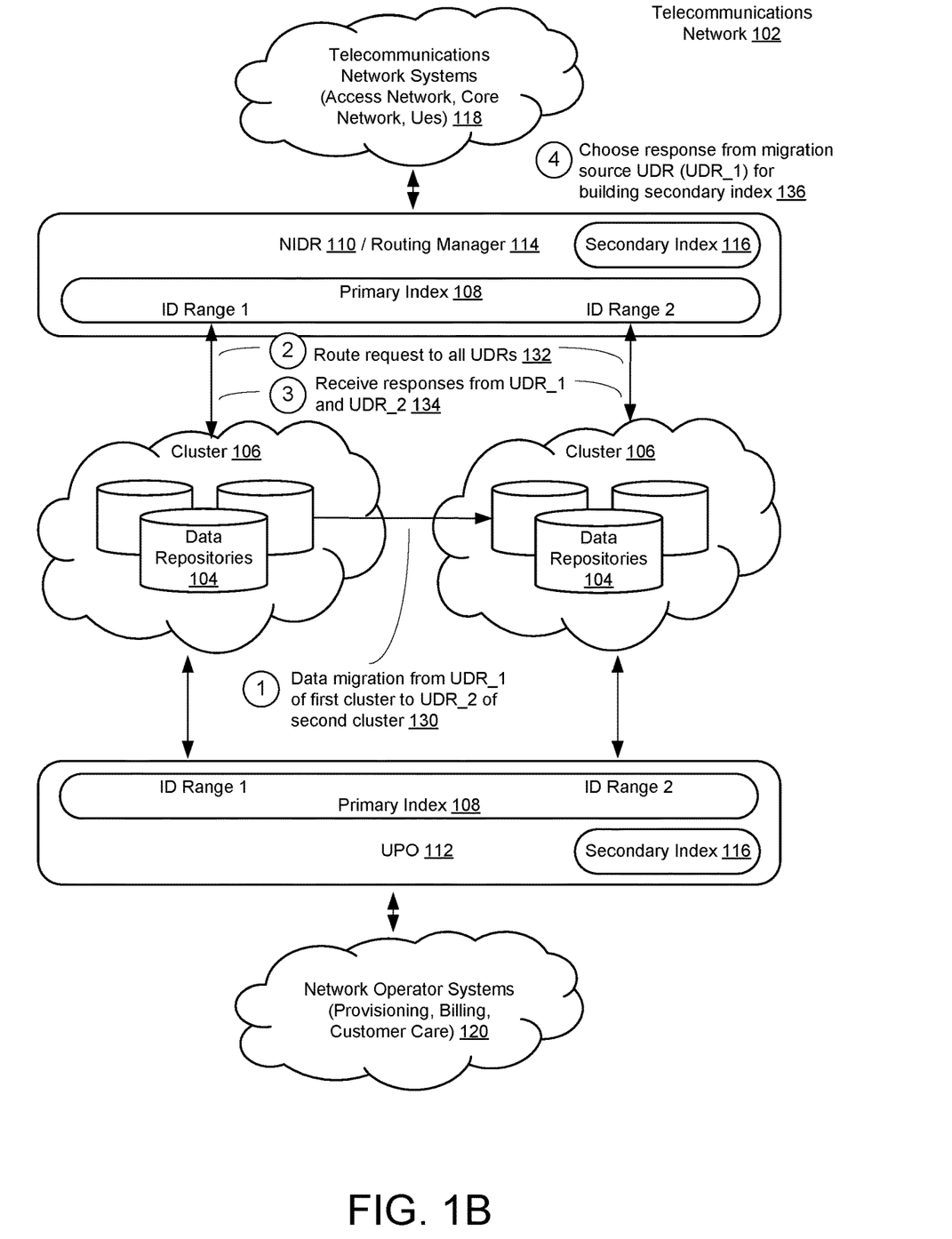

FIGS. 1A-1B are overview diagrams of a telecommunications network having multiple data repositories mapped to ranges of subscriber identifiers by a primary index, a node including the primary index, and other devices and logic, the node routing received messages to all data repositories when operating in a fail-open mode and building a secondary index from responses. As illustrated, a telecommunications network 102 includes data repositories 104 organized into clusters 106, each cluster 106 associated with a range of subscriber identifiers in a primary index 108. The primary index 108 may be located at a NIDR 110, a UPO 112, or at both. The NIDR 110 is associated with a routing manager 114 for receiving and sending requests to data repositories 104. In addition to the primary index 108, the NIDR 110/UPO 112 may build and use a secondary index 116 while in fail-open mode. The NIDR 110/routing manager 114 may receive requests from and send answers to other telecommunications network systems 118 (e.g., core network systems, access network systems, user equipment (UEs), etc.). The UPO 112 may receive requests from and send answers to network operator systems 120 (e.g., provisioning systems, billing systems, customer care, etc.).

In various implementations, the telecommunications network 102 may contain any network or networks of a telecommunications network operator, including both external, service providing networks and internal information technology (IT) and support networks. The data repositories 104 may serve and be used by both types of networks. The NIDR 110/routing manager 114 may interface with external, service providing networks, including components such as those of telecommunications network systems 118—e.g., UEs, access networks, core network nodes, etc. Such systems 118 may be part of Sixth Generation (6G) networks, 5G networks, 4G networks, 3G networks, or a later or earlier generation of networks, which may in turn be part of telecommunications network 102. The UPO 112 may interface with internal IT and support networks, including components such as those of network operator systems 120—e.g., provisioning systems, billing systems, customer care, etc.

The data repositories 104 may each be any sort of subscriber profile database used in telecommunications networks (such as telecommunications network 102). For instance, the data repositories may be UDRs, HSSs, or HLRs. Each subscriber profile stored in a data repository 104 may include at least one subscriber identifier. Such subscriber identifiers may include at least one of a subscription permanent identifier (SUPI), a subscription concealed identifier (SUCI), an international mobile subscriber identity (IMSI), a mobile station international subscriber directory number (MSISDN), an Internet Protocol (IP) multimedia public identity (IMPU), or an IP multimedia private identity (IMPI). One of these subscriber identifiers (e.g., an IMSI) may be used for mapping subscriber profiles to data repositories 104, with a given range of subscriber identifiers assigned to a given data repository (e.g., "IMSI range 1" to "UDR_1"). Subscriber profiles may also store other information such as subscriber name, plan type, etc. In some implementations, the data repositories 104 may be associated into clusters 106. Such clusters 106 may represent a physical location, a device, a logical grouping, etc. For instance, a range of subscriber identifiers may map to a cluster 106, with each data repository 104 in the cluster 106 assigned a part of that range. Operations of the data repositories, such as responding to requests and data migration, are discussed further herein with reference to FIG. 1A and FIG. 1B, respectively.

In various implementations, the primary index 108 may be located at either or both of NIDR 110 or UPO 112. The primary index 108 may include ranges of subscriber identifiers mapped to clusters 106, ranges of subscriber identifiers mapped to data repositories 104, or both. Each range may be associated with a timestamp at which the entry for the range was last updated. Such timestamps may be used in updating and validating the primary index while the node including it is operating in a fail-open mode. The fail-open mode may be triggered by a problem with the primary index 108 and may cause the node including that primary index 108 to enter a fail-open mode. A setting for such a mode may be part of the primary index 108 or tracked separately from it. When the primary index 108 is located at two nodes (e.g., NIDR 110 and UPO 112) and one of the nodes enters fail-open mode, it may inform the other and the other may also enter fail-open mode.

The NIDR 110 may be a component that manages the primary index 108 and secondary index 116, and its complementary/co-located routing manager 114 may receive and respond to requests from telecommunications network systems 118. The routing manager may also route requests to a specific data repository 104 or cluster 106, to a subset of data repositories 104 or clusters 106 or to all data repositories 104 or clusters 106, at the direction of the NIDR 110. It may receive the responses to those routed requests, sending them on to the telecommunications network systems 118 and copying them to the NIDR 110. The NIDR 110, as described further herein, directs the routing manager 114 which data repositories 104 or clusters 106 to route to (e.g. based on subscriber identifiers in received requests and fail-open status) and builds the secondary index based on responses from data repositories 104 or clusters 106.

In some implementations, the UPO 112 may also be a component that manages the primary index 108 and secondary index 116. Additionally, the UPO 112 may perform some or all of the functions of the routing manager 114, but with respect to network operator systems 120 and their requests. Thus, what is said of the NIDR 110/routing manager 114 may be said of the UPO 112. Further, in some implementations, the UPO 112 may be associated with its own routing manager, or in other implementations, neither the NIDR 110 nor the UPO 112 may have a routing manager. The distribution of NIDR 110/routing manager 114 or UPO 112 functionality across components may vary from implementation to implementation.

In various implementations, the secondary index 116 may be initiated during fail-open mode of the node having the secondary index 116 and it may be built, response by response, from data repositories 104. The secondary index 116 would be a sparse data structure with, e.g., entries for some subscriber identifier ranges followed by gaps where there are no entries for other ranges. As more responses come in, those gaps become fewer. Also, as discussed further herein, the secondary index may be used to reconcile the primary index 108 so that fail-open mode may eventually be exited. Each entry in the secondary index may have a subscriber identity range, the data repository 104 or cluster 106 associated with that range, and a timestamp at which the entry was added. Once fail-open mode is exited, the node may delete the secondary index or simply release its memory to be subsequently overwritten or cleaned up.

In FIG. 1A, at 122, the NIDR 110 determines that it is operating in a fail-open mode due to an issue with the primary index 108. Based on this, the routing manager 114 routes, at 124, a received request to all data repositories 104 and receives, at 126, a response from the data repository 104 that includes the subscriber information being read from or written to. At 128, the NIDR 110 builds the secondary index 116 based on the response, uses the secondary index 116 to answer further requests, and performs reconciliation between the primary index 108 and secondary index 116.

In various implementations, each time the routing manager 114 receives a request for data from a subscriber profile, the routing manager 114 asks the NIDR 110 to identify which data repositor(ies) 104 or cluster(s) 106 to route/provide the request to. When the NIDR 110 receives such an inquiry from the routing manager, the NIDR 110 determine, at 122, whether the NIDR 110 is operating in fail-open mode. As noted herein, the NIDR 110 may do so by consulting a setting of the primary index 108 or some other setting stored on the NIDR 110. If the setting indicates that the NIDR 110 is not operating in fail-open mode, it would compare the subscriber identifier in the request received by the routing manager 114 to entries in the primary index 108, identify which subscriber identifier range the subscriber identifier belongs to, and which data repositor(ies) 104 or cluster(s) 106 are mapped to that range. The NIDR 110 would then identify the data repositor(ies) 104 or cluster(s) 106 mapped to the range that includes the subscriber identifier.

If the setting indicates that the NIDR 110 is operating in fail-open mode, however, the NIDR 110, the NIDR 110 next ascertains if there is a secondary index 116 and, when there is a secondary index 116, whether it includes an entry for a subscriber identifier range that includes the subscriber identifier from the request. If there is such an entry in the secondary index 116, then the NIDR 110 compares its timestamp to a timestamp for the same entry in the primary index 108 and utilizes whichever entry has the most recent timestamp. The mapped data repositor(ies) 104 or cluster(s) 106 for that entry are then returned to the routing manager 114. When there is not a secondary index 116 or when there is no entry yet that would include the subscriber identifier, the NIDR 110 responds to the routing manager 114 with an identification of all the data repositories 104 or clusters 106. The routing manager 114 then routes, at 124, the request to all of the data repositories 104 or clusters 106.

In some implementations, the routing manager 114 then receives, at 126, a response from the data repository 104 that includes the subscriber information being read from or written to. While all the data repositories 104 may receive the request, only the data repositor(ies) 104 that have the information for the subscriber identifier will respond. The routing manager 114 then passes the response back to the sender of the original request. Additionally, the routing manager 114 may copy the response to the NIDR 110 which, while it remains in fail-open mode, may use the information from the response to build, at 128, the secondary index 116. As used herein, "build" includes either creating a secondary index 116 or adding further entries to it.

In various implementations, as further requests are received, those requests are checked against the secondary index 116, which may increasingly include applicable entries. Concurrently, the NIDR 110 may reconcile the primary index 108 and secondary index 116 based on timestamps of entries and may do so on an ongoing basis until every entry in the primary index 108 contains a more recent timestamp than its counterpart entry in the secondary index 116. Once this condition is reached, the NIDR 110 may exit fail-open mode, updating a setting on the NIDR 110/primary index 108 to indicate that the NIDR 110 is no longer in fail-open mode. Following this mode update, the NIDR 110 may delete the secondary index 116 or release the memory that was being used for it. If fail-open mode is entered again at a later point in time, a new secondary index 116 would be built.

While the discussion above has been with reference to the NIDR 110 and routing manager 114, it is also applicable to the UPO 112. The UPO 112 also receives requests, queries the primary index 108 to identify the mapped data repositor(ies) 104 or cluster(s) 106 for a subscriber identifier included in the request, routes to that/those data repositor(ies) 104 or cluster(s) 106, receives response(s) from the data repositor(ies) 104 or cluster(s) 106, and sends those response(s) back to the request senders. The UPO 112 also determines when receiving a request whether it is operating in fail-open mode, checks to see if there is a secondary index 116, checks to see if it includes an entry for the subscriber identifier included in the request, and, when it does not include a subscriber identifier, routes the request to all data repositories 104 or clusters 106. UPO 112 also receives responses, sends those on the to the request senders, and builds the secondary index 116 based on the responses. And while in fail-open mode, the UPO 112 reconciles between the primary index 108 and secondary index 116 based on timestamps.

Further, when both the NIDR 110 and the UPO 112 include a primary index 108, those two nodes may reconcile with each other based on timestamps in their respective primary indices 108.

In FIG. 1B, at 130, the telecommunications network 102 is performing data migration from a UDR_1 104 of a first cluster 106 to a UDR_2 104 of a second cluster 106. At 132, during the data migration, the routing manager 114 routes a received request to all data repositories 104 and receives, at 134, responses from both UDR_1 104 and UDR_2 104. Based on an indication of which of the UDR_1 104 and UDR_2 104 is the migration source, the NIDR 110 may choose, at 136, to treat the response from the migration source as the source of truth for building the secondary index 116.

In various implementations, data migration among data repositories 104 or clusters 106 may happen concurrently with the NIDR 110 or the UPO 112 operating in fail-open mode. Data migration may include receipt by a data migration tool of a range of subscriber profiles in a source data repository (e.g., UDR_1) to be migrated, as well as the target data repositor(ies) (e.g., UDR_2 and UDR_3) designated to receive those subscriber profiles. For example, an IMSI range 1-10 may be migrated from UDR_1 to UDR_2 and a IMSI range of 11-20 may be migrated from UDR_1 to UDR_3. Upon receiving these ranges, the tool may open a read transaction to UDR_1, fetch the entire profiles, and leverage a soft lock functionality. The tool may also write timestamps in UDR_1 to the entries being migrated. The tool then opens write transactions to the target data repositories (UDR_2 and UDR_3), creates profiles in the target data repositories corresponding to those profiles being migrated, and writes timestamps to the created profiles. Following this, the tool updates indices in the NIDR 110 and UPO 112 (e.g., the primary indices 108) so that the target data repositories are used going forward for the subscriber identifiers associated with the migrated profiles. Any changes then made to, e.g., the subscriber profiles may be synched back to the source data repository (e.g., UDR_1), allowing UDR_1 to be used as a "source of truth" during any point in a data migration so that a NIDR 110 or UPO 112 operating in fail-open mode does not need to be aware what stage of progress in data migration that the data repositories 104 are in.

During this data migration, the source and target data repositories 104 may respond with at least one of the timestamps written as part of data migration or an indication of whether they are source or target data repositories for the subscriber identifier associated with a given request. Thus, when a request is routed, at 132, to source and target data repositories 104, those repositories include in their responses, at 134, timestamps, source/target indications, or both.

At 136, the routing manager 114 or UPO 112 receives responses from both the source and target data repositories 104 for a request including a given subscriber identifier and chooses which response to act upon. The routing manager 114 or UPO 112 may use the timestamps or source/target indication in making that choice. In one example, the routing manager 114 or UPO 112 may always select the response from the source data repository 104. In another example, the routing manager 114 or UPO 112 may simply select whichever response is associated with a more recent timestamp. Once the response is selected, the routing manager 114 or UPO 112 may proceed in the manner described above (e.g., send the response on to the request sender, copy it to the NIDR 110/UPO 112 for building the secondary index 116, etc.).

Figure 2:
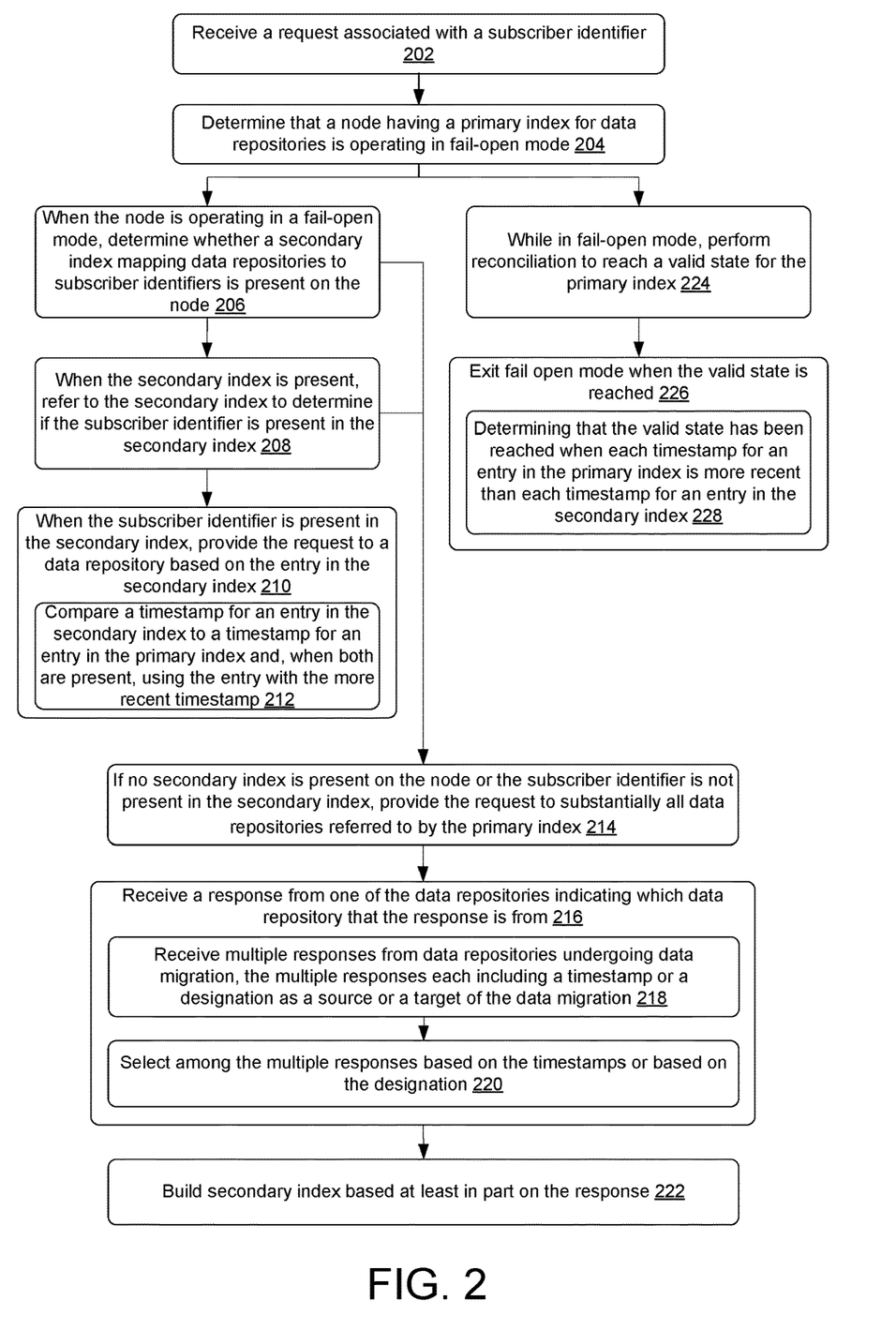
FIG. 2 is a flow diagram of an illustrative process for routing received messages to all data repositories when the node having a primary index to those data repositories is operating in a fail-open mode and building a secondary index from responses.

FIG. 2 illustrates an example process. This process is illustrated as logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

FIG. 2 is a flow diagram of an illustrative process for routing received messages to all data repositories when the node having a primary index to those data repositories is operating in a fail-open mode and building a secondary index from responses. As illustrated at 202, node(s) of the telecommunication network may receive a request associated with a subscriber identifier. The node(s) may include a primary index for data repositories of the telecommunications network and may be a (1) UPO or (2) NIDR and routing manager. The data repositories may be UDRs and the received request may be a request for subscriber information or a request to write subscriber information. Further, the subscriber identifier associated with the received request may be at least one of a SUPI, a SUCI, an IMSI, a MSISDN, an IMPU, or an IMPI.

At 204, the node may determine that the node is operating in a fail-open mode.

At 206, when the node is operating in a fail-open mode, the node may determine whether a secondary index mapping data repositories to subscriber identifiers is present on the node.

At 208, when the secondary index is present, the node may refer to the secondary index to determine if the subscriber identifier is present in the secondary index. At 210, when the subscriber identifier is present in the secondary index, the node may provide the request to a data repository based on the entry in the secondary index. At 212, this providing may include comparing a timestamp for an entry in the secondary index to a timestamp for an entry in the primary index and, when both are present, using the entry with the more recent timestamp.

At 214, if no secondary index is present on the node or the subscriber identifier is not present in the secondary index, the node may provide the request to substantially all data repositories referred to by the primary index.

At 216, the node may receive a response from one of the data repositories, the response indicating which data repository that the response is from. At 218, at least a subset of the data repositories may be undergoing a data migration and the receiving comprises receiving multiple responses from multiple corresponding data repositories, the multiple responses each including a timestamp or a designation as a source or a target of the data migration. At 220, the node may then select among the multiple responses based on the timestamps or based on the designation. In some implementations, one of the multiple corresponding data repositories may be the source of the data migration, and its one of the multiple responses may be preferred over another of the multiple responses from a target of the data migration.

At 222, the node may build secondary index based at least in part on the response.

At 224, upon determining that the node is operating in fail-open mode, or at in time thereafter, the node may, while in fail-open mode, perform reconciliation to reach a valid state for the primary index. At 226, the node may exit fail-open mode when the valid state is reached. At 228, the exiting may include determining that the valid state has been reached when each timestamp for an entry in the primary index is more recent than each timestamp for an entry in the secondary index. Also, in some implementations, when the node is a NIDR, that NIDR and a UPO may reconcile when one of them experiences a failure and the reconciling may be based at least in part on a timestamp of a last successful update.

Figure 3:
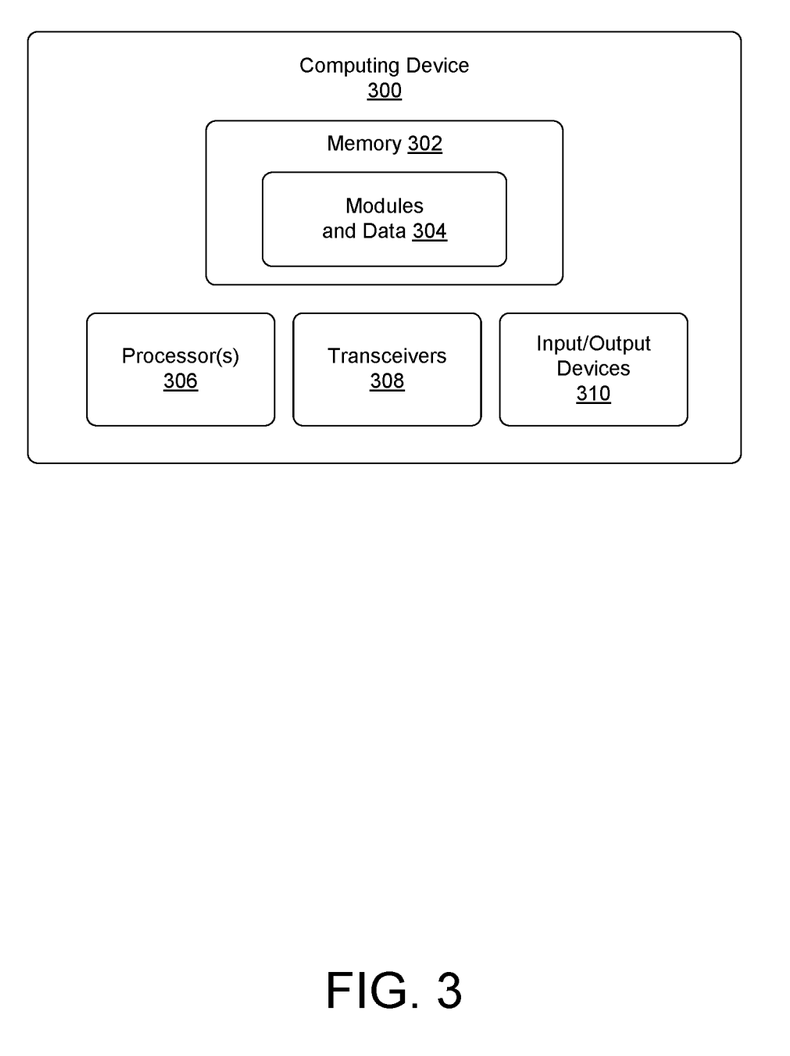
FIG. 3 is a schematic diagram of a computing device capable of implementing functionality of at least one of the node(s) of the telecommunications network.

FIG. 3 is a schematic diagram of a computing device capable of implementing functionality of at least one of the node(s) of the telecommunications network. As shown, the computing device 300 includes a memory 302 storing modules and data 304, processor(s) 306, transceivers 308, and input/output devices 310.

In various examples, the memory 302 can include system memory, which may be volatile (such as RAM), non-volatile (such as ROM, flash memory, etc.) or some combination of the two. The memory 302 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information.

The memory 302 can include one or more software or firmware elements, such as computer-readable instructions that are executable by the one or more processors 306. For example, the memory 302 can store computer-executable instructions associated with modules and data 304. The modules and data 304 can include a platform, operating system, and applications, and data utilized by the platform, operating system, and applications. Further, the modules and data 304 can implement any of the functionality for the data repositories 104, the primary index 108, NIDR 110, the UPO 112, the routing manager 114, or the secondary index 116, or any other node/device described and illustrated herein.

In various examples, the processor(s) 306 can be a central processing unit (CPU), a graphics processing unit (GPU), or both CPU and GPU, or any other type of processing unit. Each of the one or more processor(s) 306 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 306 may also be responsible for executing all computer applications stored in the memory 302, which can be associated with types of volatile (RAM) and/or nonvolatile (ROM) memory.

The transceivers 308 can include modems, interfaces, antennas, Ethernet ports, cable interface components, and/or other components that perform or assist in exchanging wireless communications, wired communications, or both.

While the computing device need not include input/output devices 310, in some implementations it may include one, some, or all of these. For example, the input/output devices 310 can include a display, such as a liquid crystal display or any other type of display. For example, the display may be a touch-sensitive display screen and can thus also act as an input device or keypad, such as for providing a soft-key keyboard, navigation buttons, or any other type of input. The input/output devices 310 can include any sort of output devices known in the art, such as a display, speakers, a vibrating mechanism, and/or a tactile feedback mechanism. Output devices can also include ports for one or more peripheral devices, such as headphones, peripheral speakers, and/or a peripheral display. The input/output devices 310 can include any sort of input devices known in the art. For example, input devices can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

Although features and/or methodological acts are described above, it is to be understood that the appended claims are not necessarily limited to those features or acts. Rather, the features and acts described above are disclosed as example forms of implementing the claims.

What is claimed is:

1. A method implemented in a telecommunications network, the method comprising:
   receiving, at node having a primary index for data repositories of the telecommunications network, a request associated with a subscriber identifier;
   determining, by the node, that the node is operating in a fail-open mode;
   based at least in part on the determining, providing, by the node, the request to substantially all data repositories referred to by the primary index;
   receiving, by the node, a response from one of the data repositories, the response indicating which data repository that the response is from;
   building, by the node, a secondary index mapping data repositories to subscriber identifiers based at least in part on the response;
   receiving, by the node, a second request while in the fail-open mode, the second request including a second subscriber identifier; and
   in response to the second request, referring, by the node, to the secondary index first and, if the second subscriber identifier is not present in the secondary index, providing the second request to substantially all data repositories referred to by the primary index.

2. The method of claim 1, wherein the node is (A) a unified subscriber database provisioning orchestrator (UPO) or (B) a network index database repository (NIDR) and a routing manager.

3. The method of claim 2, wherein the node is a NIDR and the NIDR and a UPO reconcile when one of them experiences a failure, the reconciling based at least in part on a timestamp of a last successful update.

4. The method of claim 1, further comprising:
   while in fail-open mode, performing reconciliation to reach a valid state for the primary index; and
   exiting fail-open mode when the valid state is reached.

5. The method of claim 4, further comprising determining that the valid state has been reached when each timestamp for an entry in the primary index is more recent than each timestamp for an entry in the secondary index.

6. The method of claim 1, wherein the referring to the secondary index comprises comparing a timestamp for an entry in the secondary index to a timestamp for an entry in the primary index and, when both are present, using the entry with a more recent timestamp.

7. The method of claim 1, wherein at least a subset of the data repositories are undergoing a data migration, and
   wherein receiving the response comprises receiving multiple responses from multiple corresponding data repositories, the multiple responses each including a timestamp or a designation as a source or a target of the data migration, and
   the method further comprises selecting among the multiple responses based on the timestamps or based on the designation.

8. The method of claim 7, wherein one of the multiple corresponding data repositories is the source of the data migration, and its one of the multiple responses is preferred over another of the multiple responses from a target of the data migration.

9. The method of claim 1, wherein the data repositories are unified data repositories (UDRs) and request is a request for subscriber information or a request to write subscriber information.

10. The method of claim 1, wherein the subscriber identifier is at least one of a subscription permanent identifier (SUPI), a subscription concealed identifier (SUCI), an international mobile subscriber identity (IMSI), a mobile station international subscriber directory number (MSISDN), an Internet Protocol (IP) multimedia public identity (IMPU), or an IP multimedia private identity (IMPI).

11. A node of a telecommunications network, comprising:
    one or more processors;
    a primary index mapping data repositories to corresponding ranges of subscriber identifiers;
    a secondary index built during a fail-open mode of the node from responses to requests, the responses including corresponding identifications of ones of the data repositories that include subscriber identifiers from the requests; and
    a plurality of programming instructions that, when executed by the one or more processors, cause the node to perform operations including:
       receiving a first request associated with a first subscriber identifier;
       determining that the primary index is operating in the fail-open mode;
       based at least in part on the determining, providing the first request to substantially all data repositories referred to by the primary index;
       receiving a first response from one of the data repositories, the first response indicating which data repository that the first response is from;
       building the secondary index based at least in part on the response; and
       receiving a second request while in the fail-open mode, the second request including a second subscriber identifier; and
       in response to the second request, referring to the secondary index first and, if the second subscriber identifier is not present in the secondary index, providing the second request to substantially all data repositories referred to by the primary index.

12. The node of claim 11, wherein the node is (A) a unified subscriber database provisioning orchestrator (UPO) or (B) a network index database repository (NIDR) and a routing manager.

13. The node of claim 11, wherein the operations further include:
while in fail-open mode, performing reconciliation to reach a valid state for the primary index; and
exiting fail-open mode when the valid state is reached.

14. The node of claim 13, wherein the operations further include determining that the valid state has been reached when each timestamp for an entry in the primary index is more recent than each timestamp for an entry in the secondary index.

15. The node of claim 11, wherein the referring to the secondary index comprises comparing a timestamp for an entry in the secondary index to a timestamp for an entry in the primary index and, when both are present, using the entry with a more recent timestamp.

16. The node of claim 11, wherein at least a subset of the data repositories are undergoing a data migration, and
wherein receiving the response comprises receiving multiple responses from multiple corresponding data repositories, the multiple responses each including a timestamp or a designation as a source or a target of the data migration, and
the operations further comprise selecting among the multiple responses based on the timestamps or based on the designation.

17. The node of claim 16, wherein one of the multiple corresponding data repositories is the source of the data migration, and its one of the multiple responses is preferred over another of the multiple responses from a target of the data migration.

18. A non-transitory computer storage medium having a plurality of executable instructions stored thereon that, when executed by one or more processors of a node of a telecommunications network cause the node to perform operations comprising:
receiving, at the node, a request associated with a subscriber identifier, the node having a primary index for data repositories of the telecommunications network;
determining that the node is operating in a fail-open mode;
based at least in part on the determining, providing the request to substantially all data repositories referred to by the primary index;
receiving a response from one of the data repositories, the response indicating which data repository that the response is from;
building a secondary index mapping data repositories to subscriber identifiers based at least in part on the response;
receiving a second request while in the fail-open mode, the second request including a second subscriber identifier; and
in response to the second request, referring to the secondary index first and, if the second subscriber identifier is not present in the secondary index, providing the second request to substantially all data repositories referred to by the primary index.

19. The non-transitory computer storage medium of claim 18, wherein the referring to the secondary index comprises comparing a timestamp for an entry in the secondary index to a timestamp for an entry in the primary index and, when both are present, using the entry with a more recent timestamp.

20. The non-transitory computer storage medium of claim 18, wherein at least a subset of the data repositories are undergoing a data migration, and
wherein receiving the response comprises receiving multiple responses from multiple corresponding data repositories, the multiple responses each including a timestamp or a designation as a source or a target of the data migration, and
the operations further comprise selecting among the multiple responses based on the timestamps or based on the designation.

* * * * *